(12) United States Patent
Kumar et al.

(10) Patent No.: US 12,147,847 B2
(45) Date of Patent: Nov. 19, 2024

(54) SYSTEMS AND METHODS FOR RAPID ASSIGNMENT OF PRE-PROVISIONED RESOURCES

(71) Applicant: JPMORGAN CHASE BANK, N.A., New York, NY (US)

(72) Inventors: Lalit Kumar, West Windsor, NJ (US); Satya Ghattu, Hillsborough, NJ (US); Munavar Ahmed, Hyderabad (IN)

(73) Assignee: JPMORGAN CHASE BANK, P.A., New York, NY (US)

( * ) Notice: Subject to any disclaimer, the term of this patent is extended or adjusted under 35 U.S.C. 154(b) by 478 days.

(21) Appl. No.: 17/649,047

(22) Filed: Jan. 26, 2022

(65) Prior Publication Data
US 2023/0185629 A1    Jun. 15, 2023

(30) Foreign Application Priority Data
Dec. 14, 2021    (IN) .............................. 202111058156

(51) Int. Cl.
*G06F 9/50* (2006.01)
*H04L 67/00* (2022.01)
*H04L 67/306* (2022.01)

(52) U.S. Cl.
CPC .......... *G06F 9/5077* (2013.01); *H04L 67/306* (2013.01); *H04L 67/34* (2013.01)

(58) Field of Classification Search
CPC ...... G06F 9/5077; H04L 67/306; H04L 67/34
See application file for complete search history.

(56) References Cited

U.S. PATENT DOCUMENTS

| | | | |
|---|---|---|---|
| 2019/0294477 A1* | 9/2019 | Koppes | G06F 9/5072 |
| 2020/0314145 A1* | 10/2020 | Bolignano | H04L 63/20 |
| 2020/0329464 A1* | 10/2020 | Madapoosi Sampath | H04L 67/10 |
| 2021/0306233 A1* | 9/2021 | Keller | G06N 5/04 |
| 2023/0037199 A1* | 2/2023 | Holzman | H04L 41/0843 |

* cited by examiner

*Primary Examiner* — Sisley N Kim
(74) *Attorney, Agent, or Firm* — GREENBERG TRAURIG LLP (57) ABSTRACT

Systems and methods for rapid assignment of pre-provisioned resources are disclosed. In one aspect, a method comprises receiving, at a platform interface of an infrastructure as code (IaC) platform a request for a custom virtual resource; determining, based on parameters, a resource requirement plan; identifying a base virtual resource associated with the request for the custom virtual resource; sending, to an orchestration platform, a request to modify the associated base virtual resource based on the resource requirement plan; sending, to the orchestration platform, a request to associate the modified base virtual resource with an application; and providing the modified base virtual resource to a user for use with the application.

20 Claims, 4 Drawing Sheets

SYSTEMS AND METHODS FOR RAPID ASSIGNMENT OF PRE-PROVISIONED RESOURCES

BACKGROUND

1. Field of the Invention

Embodiments are generally related to systems and methods for rapid assignment of pre-provisioned resources.

2. Description of the Related Art

Conventional provisioning of information technology resources relies on users indicating that new resources are needed, and support personnel manually logging into administrative interfaces and configuring the needed resources. This manual form of provision, however, is not efficient for larger organizations with many users, very large and distributed networks, or that have significant turn in resource requirements. With the advent of elastic cloud-based hardware resources, however, efficiencies may be gained through processes that rapidly build, assigned and decommission virtual resources.

SUMMARY

In some aspects, the techniques described herein relate to a method including: receiving, at a platform interface of an infrastructure as code (IaC) platform a request for a custom virtual resource, wherein the request for the custom virtual resource includes parameters that define the custom virtual resource; determining, based on the parameters, a resource requirement plan; sending, via an application programing interface (API) call, details of the resource requirement plan to an API module of the IaC platform; checking, by the API module, an inventory of base virtual resources provisioned at a datacenter; identifying, as a result of the checking, a base virtual resource associated with the request for the custom virtual resource; sending, by the API module and to an orchestration platform, a request to modify the associated base virtual resource based on the resource requirement plan; sending, by the API module and to the orchestration platform, a request to associate the modified base virtual resource with an application; and providing the modified base virtual resource to a user for use with the application.

In some aspects, the techniques described herein relate to a method, wherein the request for the custom virtual resource is generated by the user.

In some aspects, the techniques described herein relate to a method, including authenticating, by the IaC platform, the user.

In some aspects, the techniques described herein relate to a method, wherein the request for the custom virtual resource specifies a virtual server as the custom virtual resource.

In some aspects, the techniques described herein relate to a method, wherein the request for the custom virtual resource specifies hardware in addition to default hardware allocated to the base virtual resource.

In some aspects, the techniques described herein relate to a method, including modifying, by the orchestration platform, the base virtual resource by allocating to the base virtual resource the specified hardware in addition to default hardware allocated to the base virtual resource.

In some aspects, the techniques described herein relate to a method, wherein the base virtual resource is configured based on configuration files stored in a configuration database.

In some aspects, the techniques described herein relate to a method, wherein the configuration files include virtual resource inventory metadata.

In some aspects, the techniques described herein relate to a method, wherein the request for a custom virtual resource includes an input resource file.

In some aspects, the techniques described herein relate to a method, wherein the determining the resource requirement plan includes comparing the input resource file to a current-state file associated with the base virtual resource.

In some aspects, the techniques described herein relate to a system including an infrastructure as code (IaC) platform, wherein the IaC platform is configured to: receive, at a platform interface of the (IaC) platform, a request for a custom virtual resource, wherein the request for the custom virtual resource includes parameters that define the custom virtual resource; determine, based on the parameters, a resource requirement plan; send, via an application programing interface (API) call, details of the resource requirement plan to an API module of the IaC platform; check, by the API module, an inventory of base virtual resources provisioned at a datacenter; identify, as a result of the check, a base virtual resource associated with the request for the custom virtual resource; send, by the API module and to an orchestration platform of the IaC, a request to modify the associated base virtual resource based on the resource requirement plan; send, by the API module and to the orchestration platform, a request to associate the modified base virtual resource with an application; and provide the modified base virtual resource to a user for use with the application.

In some aspects, the techniques described herein relate to a system, wherein the request for the custom virtual resource is generated by the user.

In some aspects, the techniques described herein relate to a system, wherein the IaC platform is configured to authenticate the user.

In some aspects, the techniques described herein relate to a system, wherein the request for the custom virtual resource specifies a virtual server as the custom virtual resource.

In some aspects, the techniques described herein relate to a system, wherein the request for the custom virtual resource specifies hardware in addition to default hardware allocated to the base virtual resource.

In some aspects, the techniques described herein relate to a system, wherein the orchestration platform is configured to modify the base virtual resource by allocating to the base virtual resource the specified hardware in addition to default hardware allocated to the base virtual resource.

In some aspects, the techniques described herein relate to a system, wherein the base virtual resource is configured based on configuration files stored in a configuration database.

In some aspects, the techniques described herein relate to a system, wherein the configuration files include virtual resource inventory metadata.

In some aspects, the techniques described herein relate to a system, wherein the request for a custom virtual resource includes an input resource file.

In some aspects, the techniques described herein relate to a system, wherein the determining the resource requirement plan includes comparing the input resource file to a current-state file associated with the base virtual resource.

DETAILED DESCRIPTION OF EMBODIMENTS

Embodiments are generally related to systems and methods for rapid assignment of pre-provisioned resources.

Virtual machines (VMs) and other virtualized resources may refer to logical compute resources that share a physical pool of hardware resources and are managed by virtual machine monitors (VMMs—also commonly referred to as hypervisors). A VMM is software that runs on one or a pool of physical computers. The physical computers are known as host machines. Each virtual machine (e.g., each instance of an operating system) that executes on the physical computers may be referred to as a guest machine. A guest machine (i.e., a VM) may be based on any suitable operating system (e.g., Unix®, Linux®, Windows®, etc.) and may be configured as a traditional server (e.g., a webserver, an application server, an email server, etc., etc.), as an appliance such as a firewall, a load balancer, a virtual switch, etc., or as any suitable resource that may be virtualized A VMM provides a VM with a virtual operating platform that emulates hardware resources for use by the VM. That is, a VMM may emulate a suitable hardware platform for a virtual resource based on the available hardware resources in a pool of resources (e.g., a rack of hardware servers), allocate a portion of the resources to the virtual resource, and manage execution of the virtual resource in the emulated hardware platform and with the hardware resources allocated to the virtual resource. In accordance with embodiments, hardware resources may be pooled in public or private datacenters, clouds, etc.

In accordance with embodiments, in addition to allocated hardware, VMs and other virtual resources (VRs) may by provisioned from a set of configuration files that includes a base image of an operating system (OS) in a file form that contains the installation files from an operating system vendor, and a set of configuration files that record information used by a VMM in provisioning and managing the corresponding VM. The configuration files may be in a format provided by, or that is compatible with, an associated VMM.

In accordance with embodiments, infrastructure as code (IaC) refers to a technique to develop and maintain infrastructure provisioning and configuration in a way similar to the way software application code is developed and maintained. Under IaC techniques, provisioning of resources may be automated with declarative code that refers to configuration files. Resource templates may be created for reproducibility. And configuration, template, declarative code, and other files may be stored in a repository that facilitates version control so that these files are discoverable and may be audited. Other advantages include functionality that allows new resources and changes to existing resources to be tested in the same way that application code is tested. Moreover, on demand scaling via the scheduled execution of scripts using configuration files is also possible in an IaC environment to spin up and spin down virtual resources.

In accordance with embodiments, IaC platforms may work in conjunction with VMM systems and software (implemented at the datacenter level) to automate infrastructure tasks through the use of declarative tools and languages. Some IaC platforms may provide pre-written modules to build and manage an infrastructure. In this way, provisioning of cloud resources can be automated through the use of code and machine-readable configuration files.

In accordance with embodiments, system and methods for rapid assignment of pre-provisioned resources may be built on top of an IaC platform and may make advantageous use of the IaC platform's orchestration capabilities. A list of available resources may be generated and provided to end users of IT resources via application programming interfaces (APIs). End users may then request resources via an interface.

In accordance with embodiments, systems and methods may pre-provision virtual resources in uniform configurations into virtual resource inventories (VRIs). When an end user requests a resource via the provided interface, rapid provisioning functions can check to see if pre-provisioned resource is available, perform a delta check against parameters included in the end user's request, adjust the configuration of a pre-provisioned resource to match the end user's request, assign the custom configuration to an application specified by the end user or to the end user, and deploys the customized virtual resource for use by the end user. Customizing and assigning pre-provisioned resource may afford significant time savings over manually provisioning and customizing virtual resources.

Figure 1:
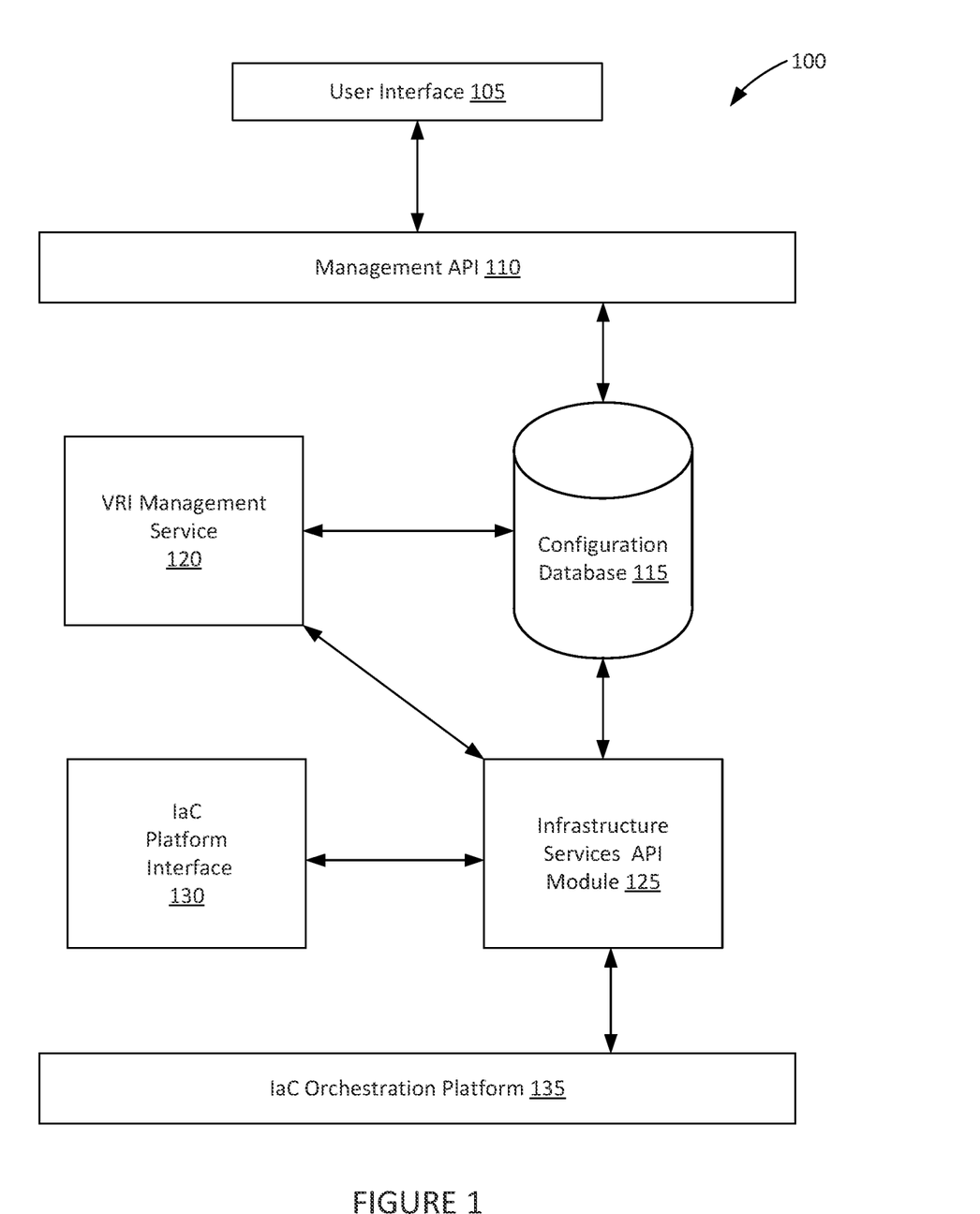
FIG. 1 is a block diagram of a system configured to provide customization and assignment of pre-provisioned virtual infrastructure resources, in accordance with embodiments.

FIG. 1 is a block diagram of a system configured to provide customization and assignment of pre-provisioned virtual infrastructure resources, in accordance with embodiments. Virtual resources, as used herein, includes VMs, virtual appliances (VAs) and other computer-network devices, components, and/or nodes that may be virtualized across, and share, a pool of hardware resources.

As shown in FIG. 1, system 100 is an infrastructure as code (IaC) platform. System 100 may include administrative interface 105. Administrative interface 105 may be accessible to users, e.g., administrative (admin) users, and may facilitate use, management, and maintenance of system 100. Administrative interface 105 may provide access to tools, both graphical and/or command line tools, that provide access to, and use of, system 100. In accordance with embodiments, administrative interface 105 may provide an interface for interacting with management API 110.

In accordance with embodiments, management API 110 may provide an administrative application programming interface (API) that facilitates management of configuration database 115. In accordance with embodiments, configuration database 115 may act as a central repository for virtual resources available within an IT infrastructure. Configuration database 115 may store virtual resource inventory metadata, virtual resource inventory configuration objects, and functional data related to virtual resources such as VMs. Virtual resource inventory metadata can include virtual resource identifiers, which can identify a data center, a configuration environment, a network zone, a service tier, etc., that the identified virtual resource belongs to. Configuration objects may define configuration settings of a virtual resource, such as a threshold number (i.e., a number of each type of resource-either on the high or the low end) that should be available in a VRI, resource metadata (as discussed above), and lifecycle operation details. Lifecycle operation details may include information such a number of retry-times to attempt a lifecycle event (e.g., a build, a reconfiguration, etc.) of the virtual resource, a destroy/delete age for a virtual resource, a time to live (TTL) for orphaned and/or incomplete resource builds, etc.

In accordance with embodiments, VRI management service 120 may build and manage a virtual resource inventory (VRI) across different data centers and different service tiers by pre-provisioning virtual resources in uniform configurations. VRI management service 120 may build the VRI based on available hardware resources at a given data center. The VRI acts as a standby pool of unassigned resources that can be rapidly modified (if needed) and assigned upon a request from an end user for a particular resource.

In accordance with embodiments, a VRI may include pools of virtual resources configured uniformly with a base-level configuration. For instance, a base level configuration for a virtual webserver may include an allocation of 2 processing cores, 4 GB of RAM, and 40 GB of storage from a pool of hardware available at a data center.

VRI management service 120 may also be responsible for keeping the pre-provisioned inventory healthy by maintaining and managing the lifecycle of individual virtual resources in a VRI. For instance, the VRI management service 120 may be configured for decommissioning, destroying and/or deleting VRI resources that failed during the build process or VRI provisions that encountered non-recoverable errors. The VRI management service 120 may further re-attempt building VRI resources that encounter recoverable errors during provisioning. VRI management service 120 may further be responsible for decommissioning and deleting VRI resources that are no longer needed.

In an exemplary embodiment, VRI management service 120 may build a VRI that includes a pool of base virtual server instances. Such a pool of base virtual server instances may be referred to as a virtual server inventory (VSI). A VRI at a datacenter may include the base virtual servers of the VSI, and the VSI may be a subset of the resources in the VRI. Other base virtual resources that may comprise a VRI include base virtual load balancer instances, base virtual firewall instances, base virtual switch/router instances, etc. In accordance with embodiments, any resource that can be virtualized may be included as a resource in a VRI.

VRI management service 120 may receive or retrieve configuration data for building and managing resources in a VRI from configuration database 115. For each resource available to be virtualized and included in a VRI, configuration database 115 may include a corresponding set of files, such as a base image of an OS and a related set of configuration files that when referenced at provisioning of the a VR, configure the VR in a default or base configuration. Other configuration and provisioning files and assets for VRs may also be stored in configuration database 115 as is necessary or desirable.

In accordance with embodiments, VRI management service 120 may further include logic that pauses the VRI building process in data centers and/or service tiers when VRI management service 120 determines that there are insufficient hardware resources for, or other obstacles to, completing the build process. Additionally, VRI management service 120 may include logic to resume a paused build once VRI management service 120 determines that sufficient hardware resources are available or that any other determined obstacles to the build process have been overcome. For instance, if VRI management service 120 is building a VRI including 5 base virtual server instances in a particular data center, but determines there are only enough hardware resources at the data center to complete 3 base server instances, VRI management service 120 may build 3 base server instances and pause building of the remaining 2 base servers until adequate hardware resources in the data center are free.

In accordance with embodiments, IaC platform interface 130 may facilitate the assigning of virtual resources to various uses. IaC platform interface 130 may assign VRs to specified uses based on requests submitted by end users for specified VRs. Upon receipt of a request to assign virtual resources, and based on parameters included in the request, IaC platform interface 130 may determine an appropriate resource type, may perform validations (such as validating correct data center, network zone, service tier, cost center, valid user application id, valid user id, etc.) and may perform a delta comparison with an execution state of a VR to determine an appropriate action or actions to take. Appropriate actions may include a create action, an update action, a delete action, etc., where a virtual resource is created, updated, deleted, etc., in accordance with the determined appropriate action and the submitted end user request.

In accordance with embodiments, based on the determined appropriate action, the IaC platform interface 130 may make a corresponding API call to infrastructure services API module 125. Infrastructure services API module 125 may expose API methods (i.e., available API calls) that receive parameters from IaC platform interface 130 and invoke corresponding logic in IaC orchestration platform 135 that carries out the appropriate action as determined by IaC platform interface 130. Infrastructure services API module 125 may be in communication with IaC orchestration platform 135, which may be an underlying IaC platform of system 100, and may include logic to carry out any action determined as appropriate by IaC platform interface 130.

Figure 2:
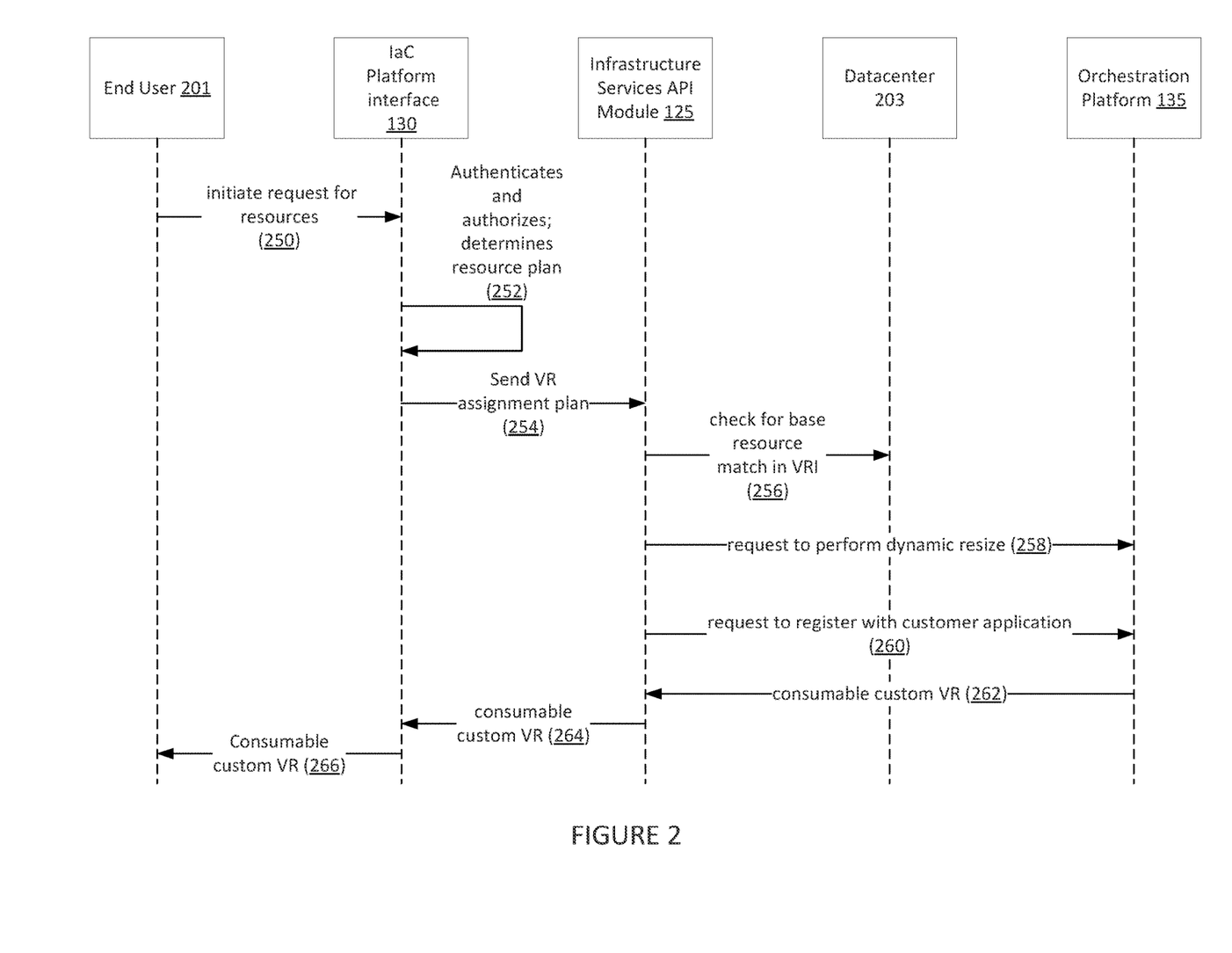
FIG. 2 is a sequence diagram showing assignment of virtual resources from a virtual resource inventory, in accordance with embodiments.

FIG. 2 is a sequence diagram for assigning virtual resources from a virtual resource inventory, in accordance with embodiments. At step 250, a user that desires virtual resources for, e.g., a business use, initiates at IaC platform interface 130 a request for the desired virtual resources. The request may include parameters such as the desired base resource (e.g., a virtual server instance, a virtual appliance, etc.), the required number of central processing units or cores, the required amount of random-access memory (RAM), the preferred amount of non-volatile storage, and/or other configurable components of a virtual resource.

At step 252, the IaC platform interface 130 may authenticate the user based on a user directory and may check that the user is authorized to request the desired virtual resources (e.g., via configured permissions related to the user directory). Once IaC platform interface 130 determines that the user has appropriate permissions, IaC platform interface 130 may determine a resource assignment plan based on the user's requested virtual resources. Determining the resource assignment plan may include a determination of a resource state. That is, IaC platform interface 130 may determine whether the assignment plan requires an assignment of a fresh virtual resource from a VRI, an update to a configuration of an existing resource, or a deletion of a resource.

In determining a resource plan, IaC platform interface 130 may compare an input resource file submitted by a user and a current-state file from a previous execution in a user workspace. If there these is no previous execution (and therefore no current-state file), IaC platform interface 130 will determine that the user request is a request for a new resource and generate a plan to create a fresh virtual resource from the VRI configured with user provided inputs from the input resource file. If a current-state file is present in a user workspace then IaC platform interface 130 will compare the user input file with the current-state file to determine the difference in schema between the user input resource file and the current-state file. Based on these differences in schema, IaC platform interface 130 will generate an update plan to update the virtual resource such that the current-state file will include any missing features, components, hardware resources, etc., of the user input file. IaC platform interface 130 plans may include what resources will be newly created, what resources will be destroyed, what resources will be updated in place and what resources will be recreated (destroy and create).

At step 254, IaC platform interface 130 may send the resource assignment plan to infrastructure services API module 125. At step 256, infrastructure services API module 125 may check the VRI of datacenter 203 to determine if a matching base virtual resource exists in datacenter 203. In one embodiment, datacenter 203 may be specified as a preferred datacenter in the user's request for the desired virtual resources. In other embodiments, infrastructure services API module 125 may choose datacenter 203 based on available base resources in datacenter 203's VRI, available hardware resources at datacenter 203, physical proximity to the requesting user, or any other criteria that is necessary or desirable. If infrastructure services API module 125 finds a base resource that is compatible with the end user's request for a virtual resource, then infrastructure services API module 125 will select the compatible base resource to assign to the user's request and determine what, if any additional configuration steps are needed.

At step 258, infrastructure services API module 125 invokes IaC orchestration platform 135 and passes configuration parameters to IaC orchestration platform 135. For example, the end user's request for virtual resources may have included a request for a virtual webserver with 4 processing cores, 16 GB of random-access memory, and 200 GB of non-volatile storage. In contrast, the matching base server instance may be the appropriate type of web server (e.g., an Apache Tomcat® webserver as requested by the end user), but base tomcat servers in the VRI of datacenter 203 may be configured by VRI management service 120 with 2 processing cores, 4 GB of RAM, and 40 GB of storage. Accordingly, IaC orchestration platform 135 may dynamically resize the base server in the VRI to reflect the end user's desired configuration.

At step 260, infrastructure services API module 125 sends a request to IaC orchestration platform 135 to register, or associate, the selected and dynamically resized virtual resource with the end user and/or the end user's application or application environment. This step designates the virtual resource as unavailable to be allocated to other requests for virtual resources, and logically removes the virtual resource from the VRI of the relevant data center.

At steps 262-266, the resized and assigned resource (i.e., the customized virtual resource) is returned to the requesting end user for use/consumption.

In accordance with embodiments, VRI management service 120 may determine, or be informed, that a base server was dynamically configured and assigned for use, and may determine if enough hardware resources exist at the relevant data center to replace the assigned virtual resource with another base resource of the same type. Accordingly, when another end user request is received for that base resource, it will be pre-provisioned and ready for rapid resizing/updating and assignment.

Figure 3:
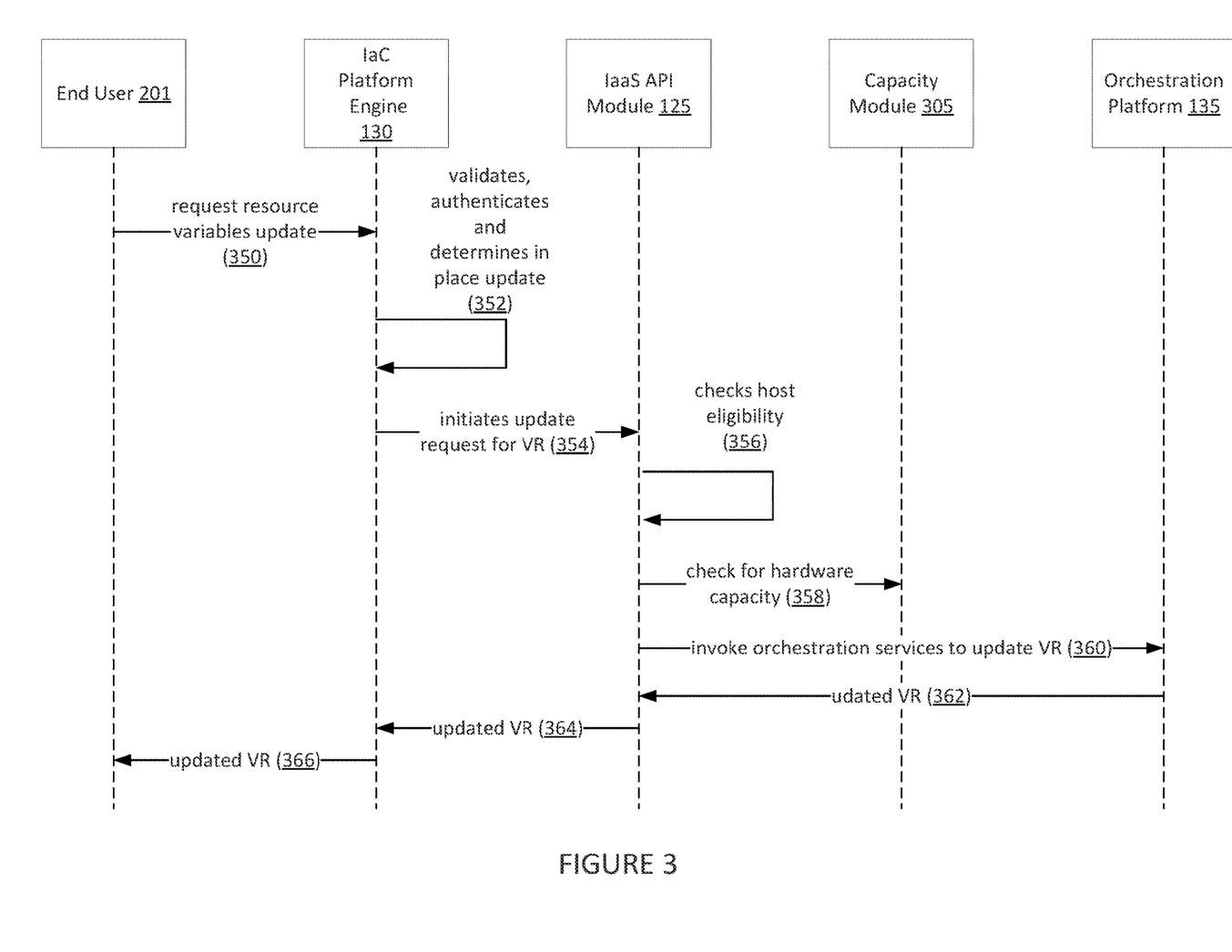
FIG. 3 is a sequence diagram showing reconfiguration of a virtual resource, in accordance with embodiments.

FIG. 3 is a sequence diagram showing reconfiguration of a virtual resource, in accordance with embodiments. At step 350, end user 201 may use IaC platform interface 130 to request a resource update to an assigned virtual resource. The resource update request may include parameters specifying different hardware resources than are currently allotted to the assigned virtual resource. For instance, the user may determine that the assigned virtual resource (e.g., a webserver) is underequipped to handle a current processing load, and may request that extra processing cores or CPUs be assigned to the virtual resource. Accordingly, the resource update request may include a request to allot 2 additional processing cores to the virtual resource, thereby bringing the total number of processing cores to 4 (given that 2 processing cores were originally requested and assigned to the virtual resource).

At step 352, IaC platform interface 130 may validate and authenticate user 201, and may then, based on the request, prepare a resource update plan. E.g., the resource update plan may include adding 2 processing cores to the assigned VR.

At step 354, IaC platform interface 130 initiates a request to perform the update plan via an API call to infrastructure services API module 125. The API call may include passing data to infrastructure services API module 125 as parameters of an API method exposed by infrastructure services API module 125. For instance, an integer (e.g., "2") may be passed in an "updateProcessingCores" method to indicate to infrastructure services API module 125 that 2 additional processing cores are desired for a specified virtual resource. In some embodiments, an identifier of the assigned virtual resource may be passed in update methods, as well.

At step 356, infrastructure services API module 125 may check the host environment for eligibility. This step includes determining if a particular virtual resource is allowed to update-in-place, since there may be restrictions on certain type of virtual resources built with particular configurations to perform an update-in-place (the alternative to a restricted update-in-place may be a destroy-recreate action to perform the update). At step 358, infrastructure services API module 125 may request, from capacity module 305, a check of available hardware resources at the data center that the specified VR is executing on in order to determine if the update request can be fulfilled. The capacity module 305 may publish an API exposing calls that return available resources to System 100. Based on a response from capacity module 305, infrastructure services API module 125 may determine that there are 2 additional (e.g., idle or unassigned) processor cores that may be allocated to the VR specified in the end user's update request.

Based on the response from capacity module 305, infrastructure services API module 125 may invoke IaC orchestration platform 135 with a request to perform the updates included in the resource update plan. For example, infrastructure services API module 125 may request that IaC orchestration platform 135 reconfigure the assigned VR by allocating 2 additional processing cores to the specified VR.

At steps 362-366, the updated VR is made available to end user 201 for use of the resource in its updated configuration state.

Figure 4:
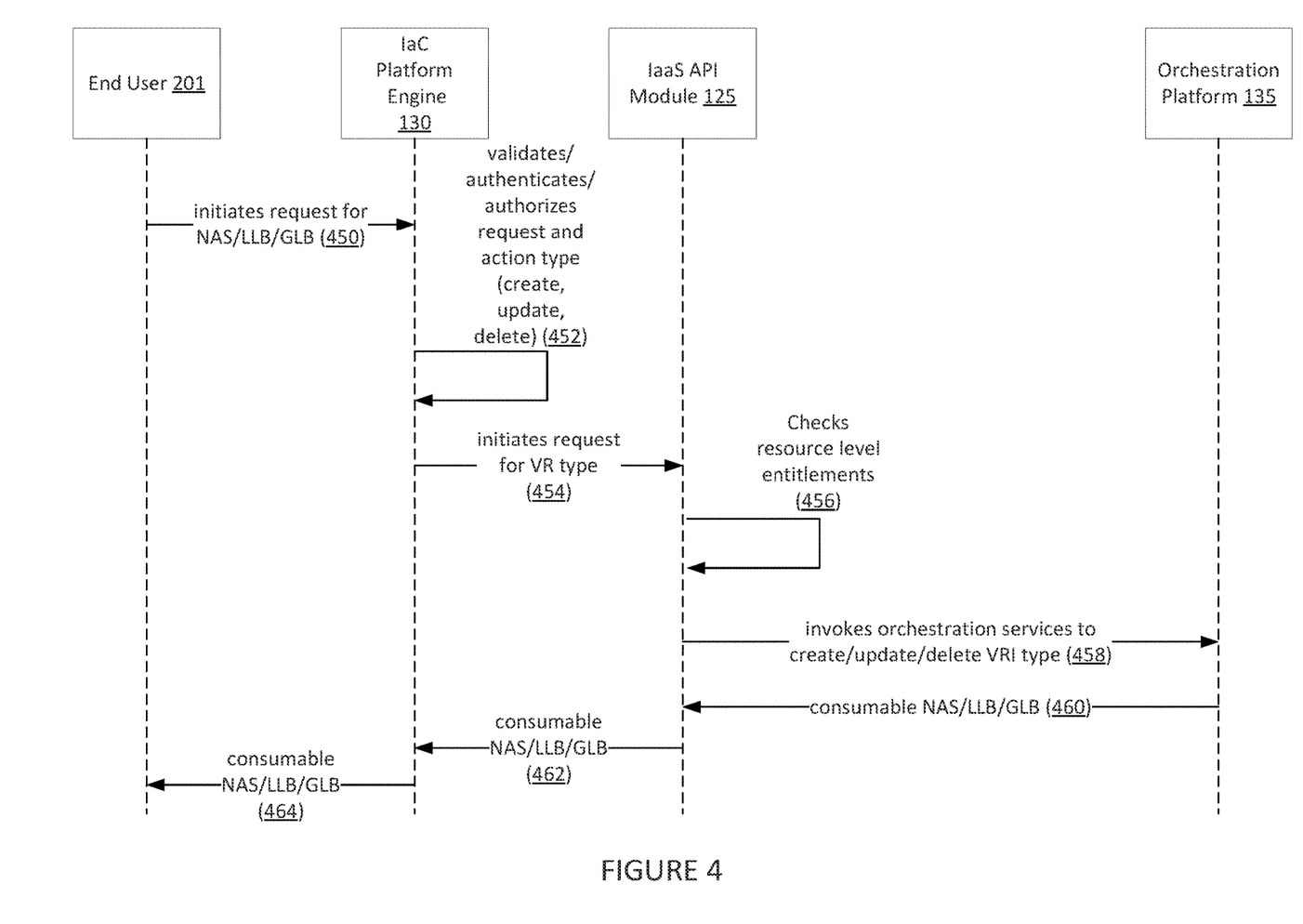
FIG. 4 is a sequence diagram showing a request involving alternative virtual resources, in accordance with embodiments.

FIG. 4 is a sequence diagram showing a request for alternative virtual resources, in accordance with embodiments. At step 450, user 201 initiates a request for an alternative virtual resource, such as network attached storage (NAS), a local load balancer (LLB), a global load balancer (GLB), or another virtualized network appliance or service. At step 452, IaC platform interface 130 may authenticate the user based on a user directory, and may check that the user is authorized to request the desired virtual resource. IaC platform interface 130 may further determine, based on the VR request from end user 201, the specified virtual resource and whether the request is to create, update, or delete the specified resource.

At step 454, IaC platform interface 130 initiates a request referencing the specified VR and the determined action with infrastructure services API module 125. At step 456, infrastructure services API module 125 checks resource level entitlements of the requesting user. Resource level entitlements refer to specific roles that a user identifier (ID) of a user must have to be able to perform various available requests. For example, to request a virtual machine resource, a user ID could be required to be assigned an INFRASTRUCTURE_MANAGER role for a particular application. To request a virtual machine configuration resource, user ID could be required to be assigned a CONFIGURATION_MANAGER role. To be able to destroy a virtual machine resource, a user ID could be required to be assigned an INFRASTRUCTURE_MANAGER role under the application including that specific resource. Additional (e.g., more fine-grained) entitlement checks may be performed at this step.

At step 458, infrastructure services API module 125 invokes IaC orchestration platform 135 passing the parameters of the request to IaC orchestration platform 135. IaC orchestration platform 135 creates, updates, or deletes the specified resource based on the received parameters. At steps 460-464, if IaC orchestration platform 135 has created or updated a specified resource, the created or updated resource is returned to end user 201 for use. Alternatively, if IaC orchestration platform 135 deleted a specified resource, IaC orchestration platform 135 may return a notification of deletion of the specified resource.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method comprising:
 receiving, at a platform interface of an infrastructure as code (IaC) platform a request for a custom virtual resource, wherein the request for the custom virtual resource includes parameters that define the custom virtual resource;

determining, based on the parameters, a resource requirement plan;

sending, via an application programing interface (API) call, details of the resource requirement plan to an API module of the IaC platform;

checking, by the API module, an inventory of base virtual resources provisioned at a datacenter;

identifying, as a result of the checking, a base virtual resource associated with the request for the custom virtual resource;

sending, by the API module and to an orchestration platform, a request to modify the associated base virtual resource based on the resource requirement plan;

sending, by the API module and to the orchestration platform, a request to associate the modified base virtual resource with an application; and providing the modified base virtual resource to a user for use with the application.

2. The method of claim 1, wherein the request for the custom virtual resource is generated by the user.

3. The method of claim 2, comprising authenticating, by the IaC platform, the user.

4. The method of claim 1, wherein the request for the custom virtual resource specifies a virtual server as the custom virtual resource.

5. The method of claim 4, wherein the request for the custom virtual resource specifies hardware in addition to default hardware allocated to the base virtual resource.

6. The method of claim 5, comprising modifying, by the orchestration platform, the base virtual resource by allocating to the base virtual resource the specified hardware in addition to default hardware allocated to the base virtual resource.

7. The method of claim 1, wherein the base virtual resource is configured based on configuration files stored in a configuration database.

8. The method of claim 7, wherein the configuration files include virtual resource inventory metadata.

9. The method of claim 1, wherein the request for a custom virtual resource includes an input resource file.

10. The method of claim 9, wherein the determining the resource requirement plan includes comparing the input resource file to a current-state file associated with the base virtual resource.

11. A system comprising an infrastructure as code (IaC) platform, wherein the IaC platform is configured to:

receive, at a platform interface of the (IaC) platform, a request for a custom virtual resource, wherein the request for the custom virtual resource includes parameters that define the custom virtual resource;

determine, based on the parameters, a resource requirement plan;

send, via an application programing interface (API) call, details of the resource requirement plan to an API module of the IaC platform;

check, by the API module, an inventory of base virtual resources provisioned at a datacenter;

identify, as a result of the check, a base virtual resource associated with the request for the custom virtual resource;

send, by the API module and to an orchestration platform of the IaC, a request to modify the associated base virtual resource based on the resource requirement plan;

send, by the API module and to the orchestration platform, a request to associate the modified base virtual resource with an application; and provide the modified base virtual resource to a user for use with the application.

12. The system of claim 11, wherein the request for the custom virtual resource is generated by the user.

13. The system of claim 12, wherein the IaC platform is configured to authenticate the user.

14. The system of claim 11, wherein the request for the custom virtual resource specifies a virtual server as the custom virtual resource.

15. The system of claim 14, wherein the request for the custom virtual resource specifies hardware in addition to default hardware allocated to the base virtual resource.

16. The system of claim 15, wherein the orchestration platform is configured to modify the base virtual resource by allocating to the base virtual resource the specified hardware in addition to default hardware allocated to the base virtual resource.

17. The system of claim 11, wherein the base virtual resource is configured based on configuration files stored in a configuration database.

18. The system of claim 17, wherein the configuration files include virtual resource inventory metadata.

19. The system of claim 11, wherein the request for a custom virtual resource includes an input resource file.

20. The system of claim 19, wherein the determining the resource requirement plan includes comparing the input resource file to a current-state file associated with the base virtual resource.

* * * * *